United States Patent
Erdogan et al.

(10) Patent No.: US 6,950,611 B2
(45) Date of Patent: Sep. 27, 2005

(54) IN-LINE POLARIZATION MONITORING AND CONTROL IN LIGHTWAVE COMMUNICATION SYSTEMS

(75) Inventors: Turan Erdogan, Spencerport, NY (US); Thomas Andrew Strasser, Warren, NJ (US); Paul Stephen Westbrook, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 497 days.

(21) Appl. No.: 09/781,857

(22) Filed: Feb. 12, 2001

(65) Prior Publication Data

US 2002/0024704 A1 Feb. 28, 2002

Related U.S. Application Data

(60) Provisional application No. 60/187,840, filed on Mar. 8, 2000.

(51) Int. Cl.[7] ............................................... H04B 10/00
(52) U.S. Cl. ........................................ 398/152; 398/158
(58) Field of Search ........................... 398/34, 65, 147, 398/152, 184, 205, 158

(56) References Cited

U.S. PATENT DOCUMENTS

| | | | | |
|---|---|---|---|---|
| 5,227,623 A | * | 7/1993 | Heffner | 250/225 |
| 5,296,913 A | * | 3/1994 | Heffner | 356/364 |
| 5,311,346 A | * | 5/1994 | Haas et al. | 398/146 |
| 5,440,390 A | * | 8/1995 | Tirri | 356/364 |
| 5,473,457 A | * | 12/1995 | Ono | 398/185 |
| 5,659,412 A | * | 8/1997 | Hakki | 398/152 |
| 5,815,270 A | * | 9/1998 | Lee | 356/367 |
| 5,911,016 A | | 6/1999 | Naito | |
| 5,965,874 A | | 10/1999 | Aso et al. | |
| 6,134,036 A | * | 10/2000 | Andreozzi et al. | 398/1 |
| 6,208,442 B1 | * | 3/2001 | Liu et al. | 398/9 |
| 6,385,356 B1 | * | 5/2002 | Jopson et al. | 385/11 |
| 6,519,027 B1 | * | 2/2003 | Gordon et al. | 356/73.1 |
| 6,567,167 B1 | * | 5/2003 | Chou et al. | 356/367 |

FOREIGN PATENT DOCUMENTS

| | | |
|---|---|---|
| EP | 0 964 237 A | 12/1999 |
| EP | 0982 882 | 3/2000 |
| FR | 2 781 320 A | 1/2000 |

OTHER PUBLICATIONS

"Optics" Third Edition by Hecht, Addison Wesley Longman, 1998, pp. 319–325.*

* cited by examiner

*Primary Examiner*—M. R. Sedighian
*Assistant Examiner*—Shi K. Li

(57) ABSTRACT

Polarization monitoring and control in a lightwave communication system is achieved by using an in-line polarimeter in conjunction with a polarization controller. The devices are readily compact, accurate and therefore capable of implementation in a variety of system applications. In one embodiment, a polarimeter and controller can be coupled together by a feedback loop between the polarimeter output and the controller input to provide "active polarization control" (APC).

11 Claims, 7 Drawing Sheets

IN-LINE POLARIZATION MONITORING AND CONTROL IN LIGHTWAVE COMMUNICATION SYSTEMS

CROSS REFERENCE TO RELATED APPLICATION

This application claims priority from Provisional Application No. 60/187,840, filed Mar. 8, 2000.

TECHNICAL FIELD

The present invention relates to polarization monitoring and control in lightwave communication systems and, more particularly, to the use of an in-line, compact polarimeter to provide polarization monitoring and control in various system arrangements.

BACKGROUND OF THE INVENTION

As current lightwave systems approach technology limits, one property of lightwave signals that has not been exploited commercially is the degeneracy of polarization within the optical fiber. Virtually all fiber lightwave systems currently implemented have no polarization control, and in some instances take extraordinary measures to eliminate all polarization dependence. This approach enables the transmission of information without the control of polarization and in well-implemented systems there would be negligible difference in performance for any polarization. Such systems have individual signals with a polarization state that evolves over distance along the fiber, as well as in time at a specific location of the fiber. The sources of polarization evolution include changes in temperature, bending of the fiber, mechanical vibration, as well as fiber birefringence and its wavelength dependence—all of which are virtually impossible to eliminate in the field deployment of a fiber. Therefore, in order to control and mitigate fundamental polarization-related to impairments, a need remains for a compensation arrangement for overcoming these unavoidable, random variations and provide stabilized control of polarization at any desired location within the transmission fiber.

Already available within the art are a number of techniques related to exploiting and controlling the polarization degree of freedom in fiber optic communication systems. For example, it is well-known to provide polarization multiplexing of two, orthogonal independent channels at the same wavelength to double the transmission capacity. It has also been shown to launch wavelength division multiplexed (WDM) channels with alternating orthogonal polarizations to reduce nonlinearities during transmission through the fiber. The problem of first-order polarization mode dispersion (PMD) has been previously addressed by separating the principal states of polarization along a transmission link and introducing a variable delay along one path before re-combining the signals.

While these and various other prior art polarization-related techniques are known, they have not had a significant impact on commercially available systems. The fact that such significant benefits are not yet exploited beyond research demonstrations is at least in part due to the fact that although polarization evolution can be controlled in a laboratory environment, the means to accomplish such control in the field for a viable communication system does not readily exist. The components present in a laboratory that are required to facilitate such field use include a polarization monitor, and in some cases, a polarization controller or compensation device that works in cooperation with the monitor. The devices used in a laboratory for these purposes are rather large, delicate in operation and thus not well-suited for field use. In fact, since the laboratory environment does not have as many external fluctuations to contribute to the polarization evolution, it is not clear if the laboratory devices, regardless of their other drawbacks, would even work properly in the field environment.

Polarization "control" along a fiber optic span has been a difficult and unattractive proposition, due in part to the lack of effective technologies for both local polarization control and polarization monitoring. Polarization control has become less of a problem in recent years as numerous well-known technologies have been introduced, based on lithium niobate waveguides, liquid crystal birefringence, and heated polarization maintaining fiber (PMF). These devices each have one or more of a number of different shortcomings, including high current cost, high insertion loss, slow response time and/or lack of long-term repeatability or environmental stability. Even with these limitations, however, these devices are functional, and in many cases implement polarization control with cost and performance that are attractive, relative to the value they could provide in a system. Polarization monitoring, on the other hand, appears to be a greater limitation since there are fewer technology options available. In particular, the commercial devices available to date are much larger in size and cost than other optical components with similar benefits (e.g., WDM filters). Although smaller and potentially lower cost devices have been proposed, the lack of commercial availability of any such monitors indicates that these have not adequately addressed the significant system advantages of polarization control and monitoring in communication systems.

Thus, a need remains in the art for a polarization monitoring and control arrangement that is relatively inexpensive, robust and sufficiently compact so as to be capable of being deployed in a commercial lightwave system.

SUMMARY OF THE INVENTION

The need remaining in the prior art is addressed by the present invention, which relates to polarization monitoring and control in lightwave communication systems and, more particularly, to the use of an in-line, compact polarimeter to provide polarization monitoring and control in various system arrangements.

In accordance with the present invention, an in-line polarimeter is used that is capable of directly measuring the polarization in the transmission fiber within a communication system. In one embodiment, the in-line polarimeter is used in conjunction with an polarization controlling element to form an "active polarization controller". In this case, the output from the in-line polarimeter is used as a feedback signal to the polarization controller. Various other elements, including polarization beam splitters and polarization maintaining fiber can be used in conjunction with the active polarization controller embodiment of the present invention to provide polarization control and monitoring along multiple branches of a communication system.

In another embodiment of the present invention, an in-line polarimeter can be used to provide polarization-assisted wavelength demultiplexing, particularly in systems utilizing polarization-interleaved, closely-spaced WDM channels.

In accordance with the principles of the present invention, an in-line polarimeter can be utilized to fully characterize the state of polarization of an optical signal (by making four separate measurements only the fiber) or, in contrast, provide partial information regarding the state of polarization by making, for example, two measurements of the signal polarization (where this information may be useful in situations utilizing birefringent fiber).

Various other embodiments of polarization control and monitoring will become apparent during the course of the following discussion and by reference to the accompanying drawings.

BRIEF DESCRIPTION OF THE DRAWINGS

Referring now to the drawings.

DETAILED DESCRIPTION

Figure 1:
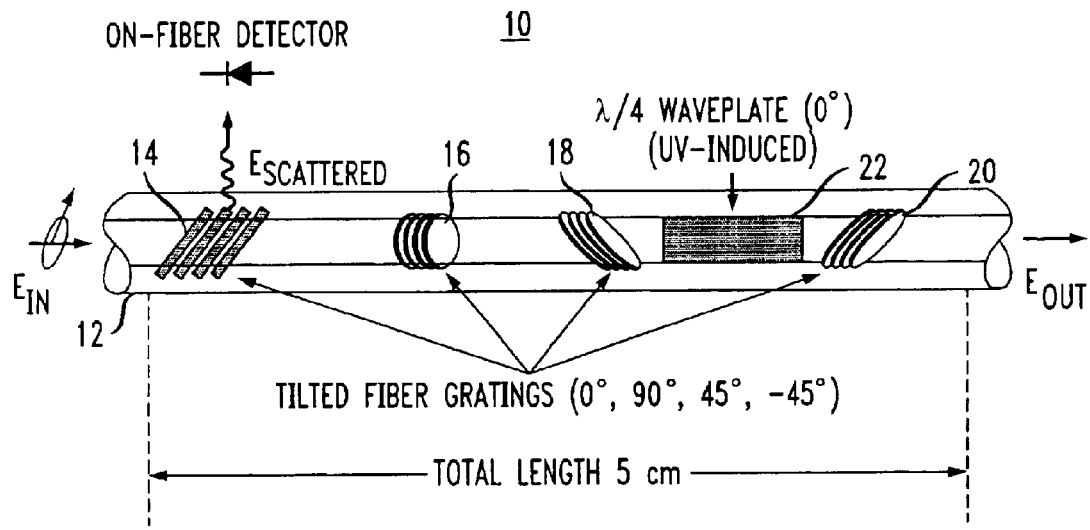
FIG. 1 illustrates an exemplary in-line, all-fiber polarimeter suitable for use in any of the below-described applications of the present invention.

The aspects of polarization monitoring and control that are utilized in the various system applications of the present invention can, in general, be implemented using any suitable in-line polarimeter arrangement. FIG. 1 illustrates an exemplary in-line, all-fiber polarimeter 10 suitable for such purposes, where the fabrication and design of such a polarimeter is discussed in detail in our co-pending application Ser. No. 09/517,865, filed Mar. 3, 2000 and assigned to the assignee of the present application. In general, polarimeter 10 comprises a section of optical fiber 12 into which is written four sets of gratings, denoted 14, 16, 18 and 20, each set oriented at a different angle with respect to the fiber axis, as shown. In this case, first grating 14 is tilted at an angle of 0°, second grating 16 at an angle of 90°, third grating 18 at 45° and, lastly, fourth grating 20 is tilted at an angle of −45° with respect to the fiber axis. In general, a set of four detectors (not shown) are associated with the four sets of gratings to monitor the out-coupled light at each grating and use this information to generate the related Stokes parameters to determine the polarization state. Importantly, a quarter wave plate 22 is disposed between third grating 18 and fourth grating 20 so that the out-coupled light into fourth grating 20 will provide the data necessary for the set of four gratings to uniquely determine the polarization state of the lightwave signal traveling through fiber 12.

Figure 2:
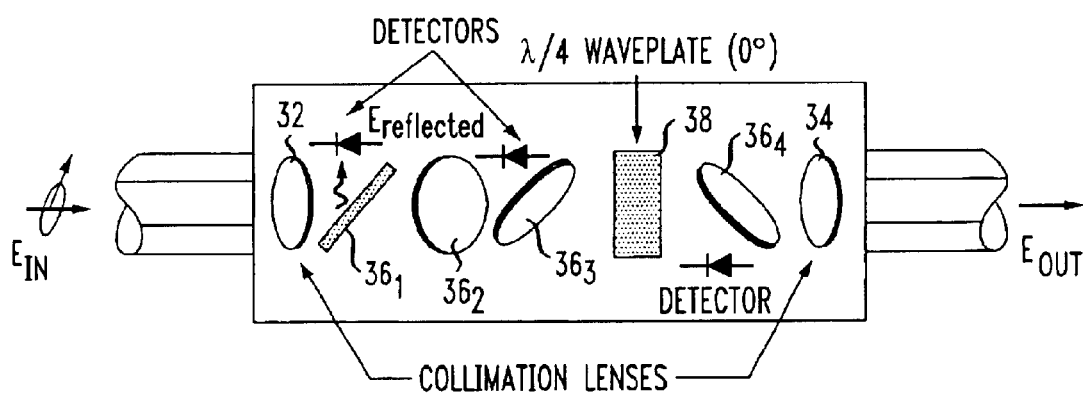
FIG. 2 illustrates an alternative in-line polarimeter, using bulk optic devices, that may also be used in any of the system applications of the present invention.

FIG. 2 illustrates a relatively compact bulk optic in-line polarimeter 30 that may be used in any of the system configurations discussed hereinbelow in place of polarimeter 10 described above. Bulk optic polarimeter 30 includes a pair of collimating lenses 32, 34 disposed at its input and output. A plurality of dielectric filters $36_1$–$36_4$ are disposed through polarimeter 30 at various predetermined orientations so as to allow for the out-coupling of light exhibiting differently polarized components. As with the arrangement of FIG. 1, a quarter wave plate 38 (of birefringent material, for example) is disposed along the transmission path to insure the necessary rotation between filters 36 required to uniquely define the state of polarization of the signal passing through polarimeter 30.

Figure 3:
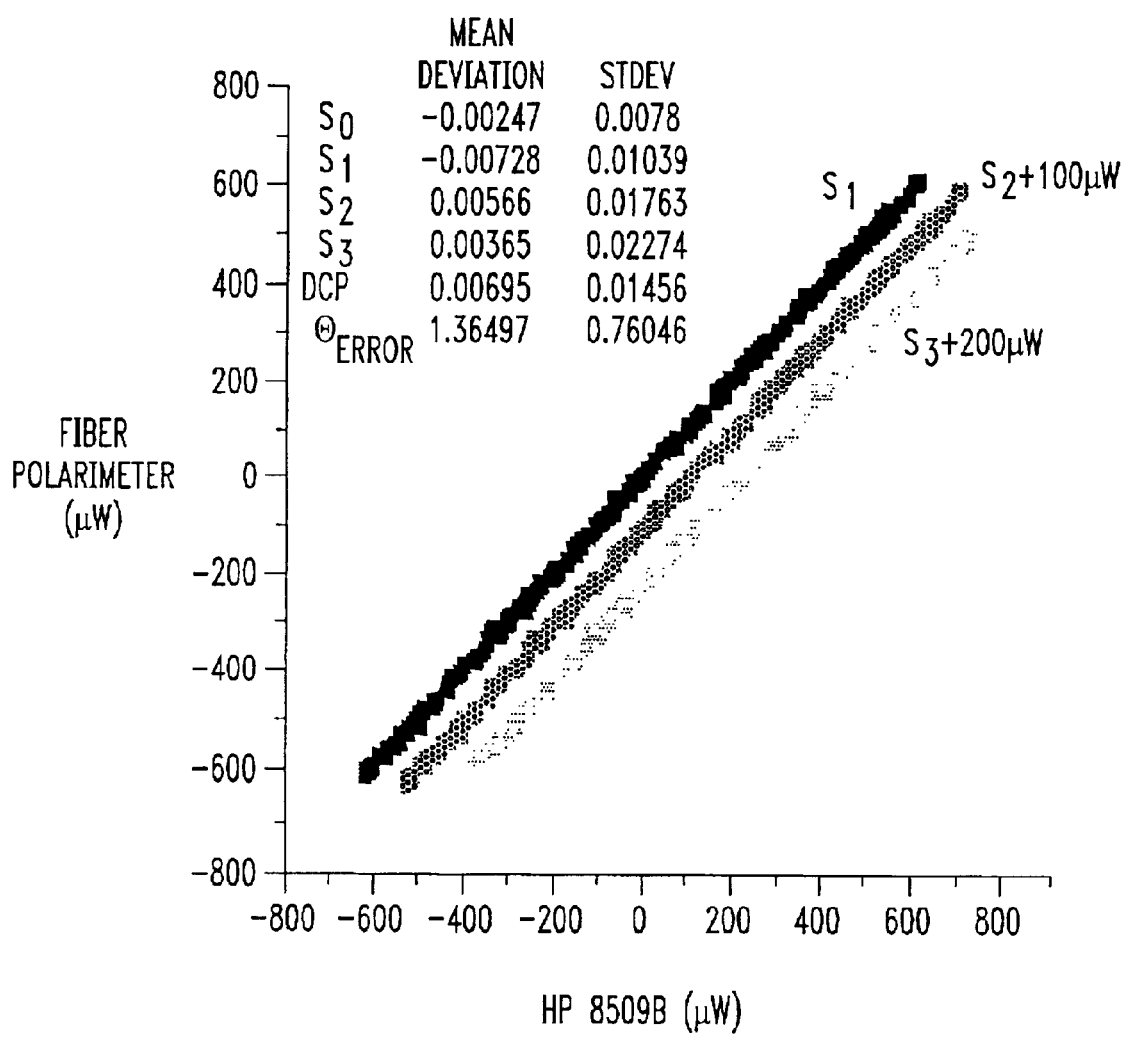
FIG. 3 is a graph comparing the accuracy of an in-line polarimeter such as illustrated in FIG. 1 to a "laboratory"-type of polarimeter that is not as readily conducive for field use.

As mentioned above, an in-line polarimeter is useful in "field" applications, but only if it is comparable in performance to the larger, more expensive laboratory polarimeter arrangements. FIG. 3 is a graph comparing the performance of an all-fiber in-line polarimeter (such as that illustrated in FIG. 1) when compared to an exemplary laboratory device, where the states of polarization measured by the laboratory device are plotted on the abscissa and those measured by the in-line device plotted on the ordinate. As shown, there is little variation between the results, thus one can rely on using the in-line "field" device to provide accurate and repeatable measurements.

Although the arrangements of FIGS. 1 and 2 illustrate a "complete" polarimeter ("complete" in the sense that all of the Stokes parameters are determined and used to completely define the state of polarization), a "partial" in-line polarimeter may also be useful in a system arrangement of the present invention. For example, an in-line partial polarimeter that performs two measurements (for example, at 0° and 90°) may be useful, particularly when used with birefringent fiber where some polarization information is already known.

Figure 4:
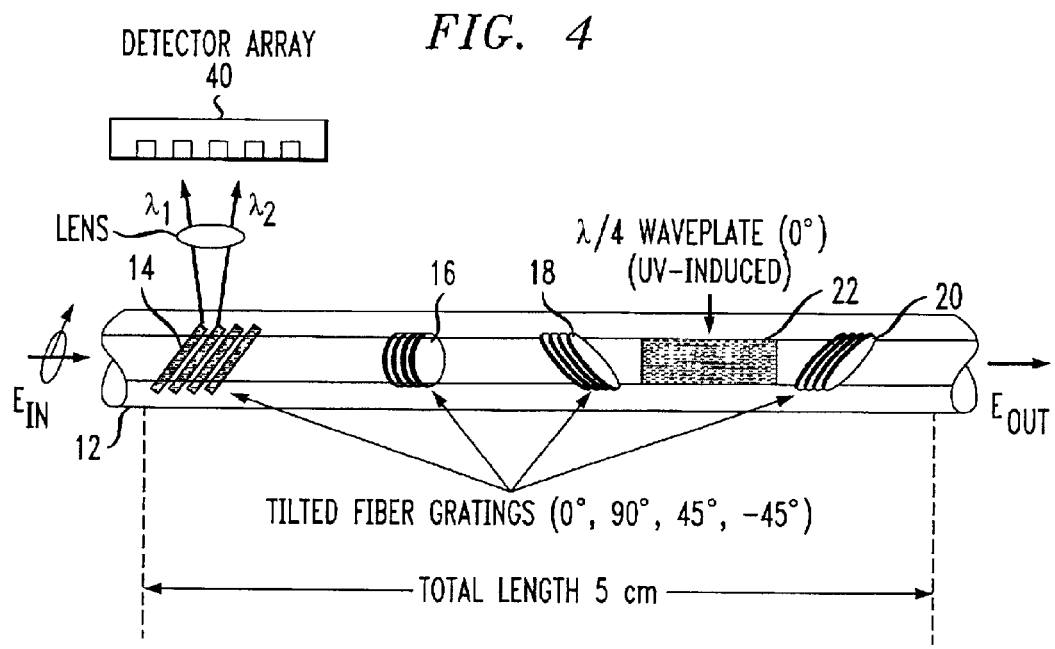
FIG. 4 illustrates a particular use of the in-line, all-fiber polarimeter of FIG. 1, using detector arrays for a multiple wavelength system.

A first system embodiment that is of interest in using an in-line polarimeter relates to WDM systems, where multiple wavelengths are simultaneously transmitted along a single fiber and there is interest in obtaining "state of polarization" information about each of the signals at each of the wavelengths. One exemplary system, as shown in FIG. 4, includes the use of detector array 40 with each grating 14–20 in polarimeter 10 as described above in association with FIG. 1. Alternatively, a detector array may be used with each dielectric filter $36_1$–$36_4$ included within polarimeter 30 of FIG. 2. In either case, each detector array 40 includes a plurality of wavelength-selective elements, such that each separate detector in the array will record a particular wavelength. In an alternative WDM system embodiment, RF tones may be encoded onto the individual signals, then used to determine the relative fraction of light incident on a detector (a single detector, not an array) that is associated with a given signal. The latter approach is of interest for identification of polarization states for the purpose of polarization demultiplexing of two signals at or near the same wavelength.

Figure 5:
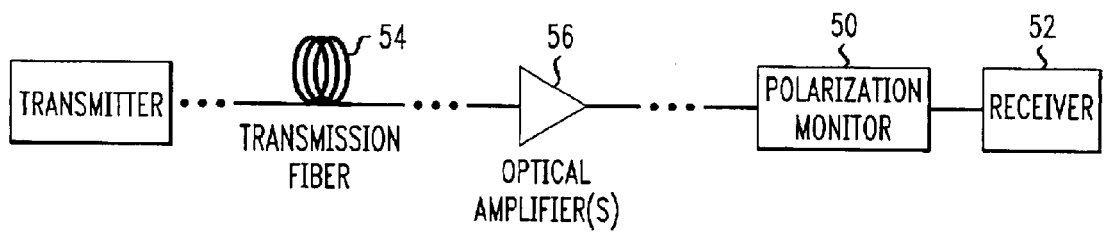
FIG. 5 contains a diagram of an exemplary lightwave communication system utilizing a polarization monitor for "real time" polarization evaluation.

In another system embodiment, it may be useful to monitor the polarization state of a lightwave signal as a function of time. FIG. 5 illustrates an arrangement for providing such a measurement, where an in-line polarimeter 50 (which may be, for example, either polarimeter 10 of FIG. 1 or polarimeter 30 of FIG. 2) is disposed prior to a receiver 52. A number of system components, including transmission fiber 54 and one or more optical amplifiers 56 all contribute to the evolution of the polarization state of the signal as it appears at receiver 52. In this particular arrangement, therefore, the polarization state immediately prior to the receiver can be measured and the receiver adjusted accordingly. In another arrangement, the polarimeter may be disposed either before or after a polarization mode dispersion compensator, and the compensator output used as the input to the comparator. In other embodiments, an in-line polarimeter may be disposed immediately prior to an exemplary optical amplifier 56 so that the operation of amplifier 56 can be adjusted as a function of polarization. In general, using an in-line polarimeter to generate polarization information is useful in any of the following circumstances: (1) monitoring of the orthogonality of launched signals at the transmitter to verify appropriate alignment for multiplexing of orthogonal polarizations; (2) monitoring of signal "depolarization", where "depolarization" is useful for purposes of polarization mode dispersion (PMD) monitoring or compensation; (3) measuring the signal-to-noise ratio in systems where the depolarized portion of a signal is proportional to the signal noise; (4) measuring the polarization-dependent transfer function of a transmission system in real time for purposes of (for example) monitoring PMD; (5) monitoring and finding polarization states in the fiber that can cause system outages or easier transmission windows and, in general, (6) monitoring optical PMD compensation. Indeed, it is contemplated that a communication system may use more than one in-line polarimeter, with a different polarimeter disposed prior to each "polarization sensitive" element (i.e., polarization beam splitter, optical amplifier, etc.). In one embodiment, a first in-line polarimeter may be disposed at a transmitter to "monitor" the optical input polarization and a second in-line polarimeter may be disposed at a receiver to "control" the polarization of the output signal. Telemetry signals can be used to send information about the output polarization from the receiver back to the transmitter.

Figure 6:
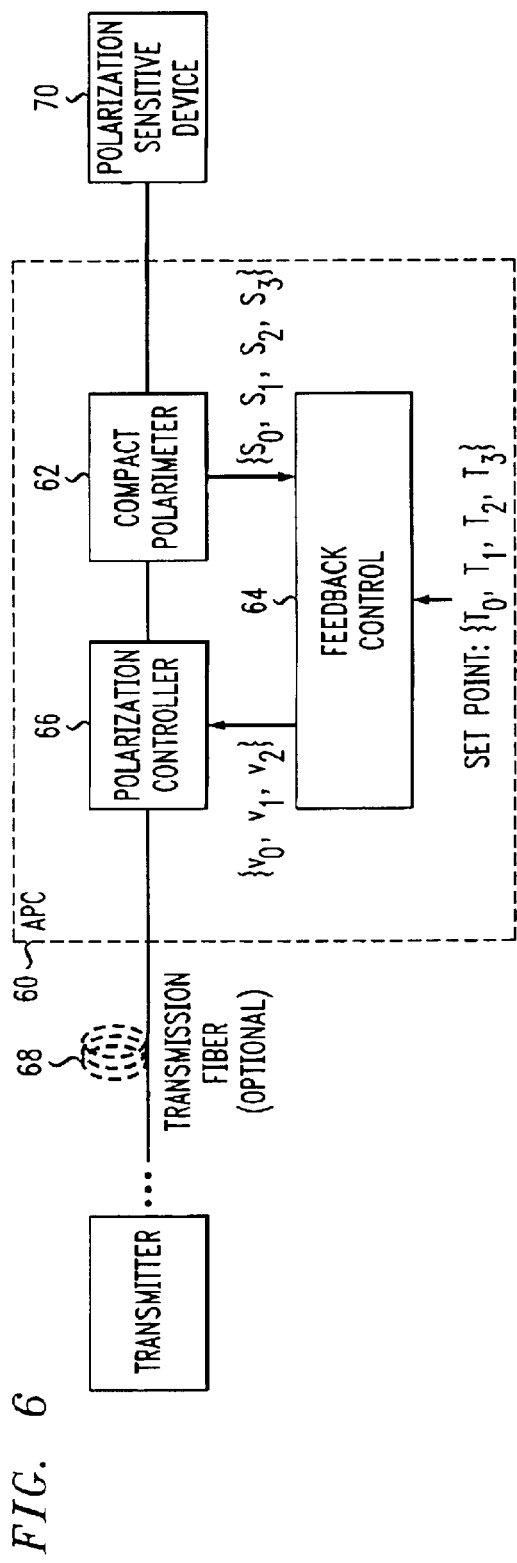
FIG. 6 is a diagram of an exemplary "active polarization control" (APC) arrangement, including an in-line polarimeter, feedback element and polarization controller.

FIG. 6 illustrates another system embodiment where an in-line polarimeter is utilized to monitor and control, in conjunction with other components, the state of polarization of an optical signal passing through the system. In particular, an "active polarization control" (APC) arrangement 60 is illustrated as comprising an in-line polarimeter 62, used in conjunction with a feedback control element 64 and polarization controller 66 to evaluate and adjust (when necessary) the polarization of an input signal that has propagated along an optical signal path, such as a transmission fiber 68. The combination of feedback control element 64 with a fully-characterized polarization controller 66 enables deterministic feedback control to quickly and effectively maintain a desired, arbitrary polarization state in the output signal. When the output of APC 60 is to be provided as an input to a polarization sensitive device 70, a preferred embodiment utilizes a section of polarization maintaining fiber (PMF) 72 as the lightguiding medium between the output of APC 60 and the input of device 70.

Figure 7:
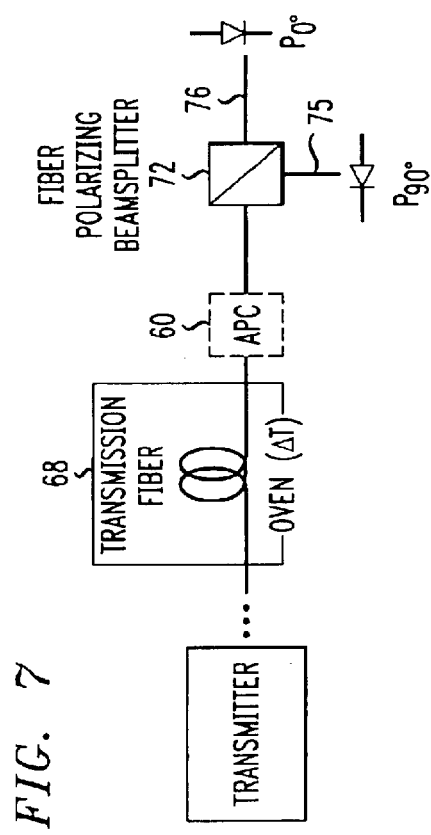
FIG. 7 illustrates an alternative communication system environment, utilizing an active polarization control arrangement in conjunction with a polarization beam splitter.
Figure 8:
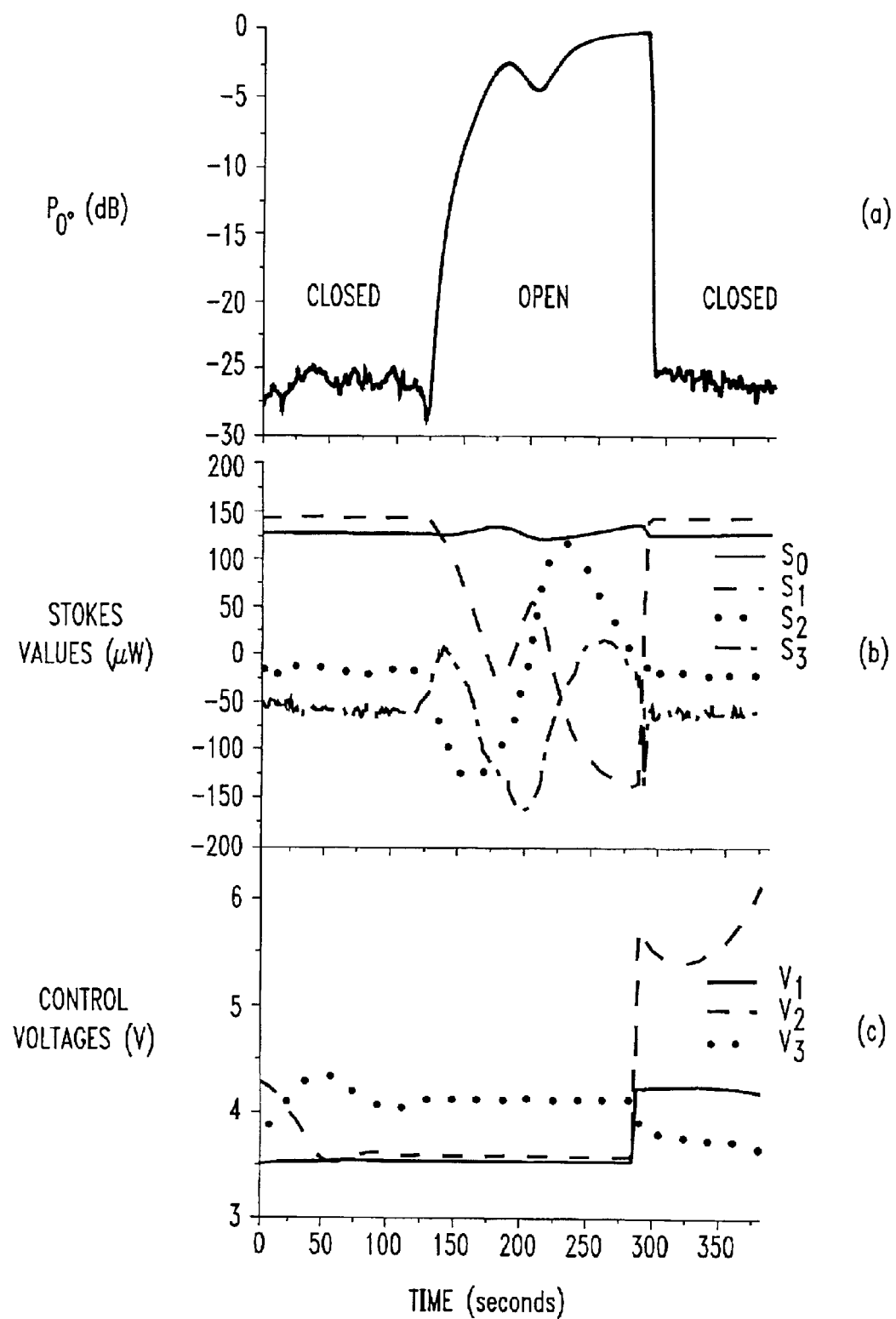
FIG. 8 contains a set of graphs illustrating the improvement in performance of a lightwave communication system using an active polarization control arrangement.

Polarization sensitive device 70 may comprise any one of a various number of optical devices whose properties vary as a function of the polarization state of the input signal. FIG. 7 illustrates a particular embodiment where polarization sensitive device 70 comprises a polarization beam splitter. As shown, the power observed in each arm of beam splitter 72 when APC 60 has stabilized the polarization represents an independent test of the performance of APC 60. In particular, FIG. 8 illustrates data associated with the performance of the system as shown in FIG. 7. FIG. 8($a$) is a graph of the extinction ratio through polarization beam splitter 72 when APC 60 is activated ("closed") versus when the feedback loop is taken out ("open"). It is clear from this data that when the APC feedback loop is closed, the power remains very stable, as further confirmed by the Stokes parameter values shown in the graph of FIG. 8($b$). Furthermore, as shown in FIG. 8($c$), the control voltages are changing significantly to compensate for polarization changes that occur for 10 km of fiber cooling in an oven.

Figure 9:
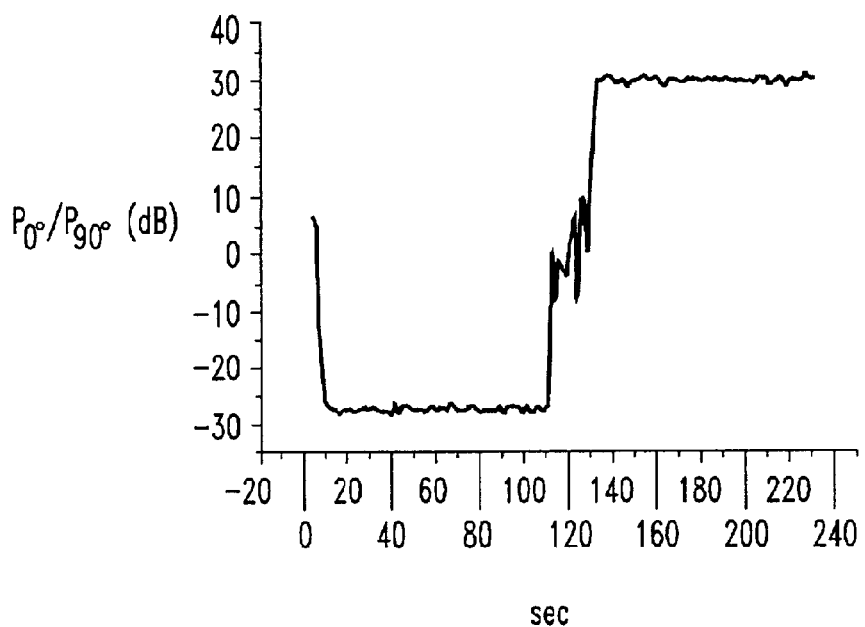
FIG. 9 is a graph of the response of the system as shown in FIG. 7 when the Stokes parameters are inverted to switch between the two orthogonal states of the polarization beam splitter.
Figure 10:
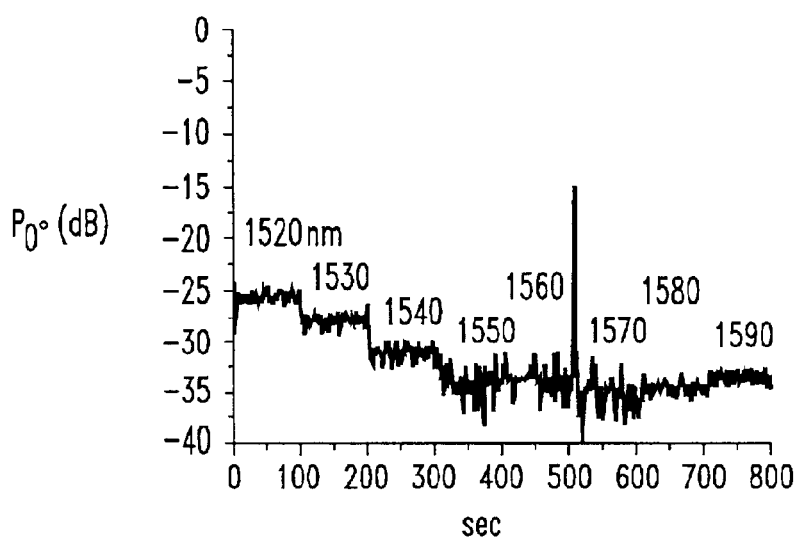
FIG. 10 is a graph illustrating the wavelength independence of the operation of the system as shown in FIG. 7.

In addition to stabilizing at one position, APC 60 is able to alternate between two orthogonal polarizations, as shown in FIG. 9. By simply reversing the signs of the S1, S2 and S3 Stokes vectors, it is possible to change the path of light from one arm 75 of beam splitter 72 to another arm 76. A final test that is useful in this configuration of the present invention is to change the wavelength while APC 60 directs light through either arm 75 or arm 76 of beam splitter 72. FIG. 10 illustrates the results of this test, where it is clear that both APC 60 and beam splitter 72 exhibit stable performance over the entire 70 nm range that was tested.

Figure 11:
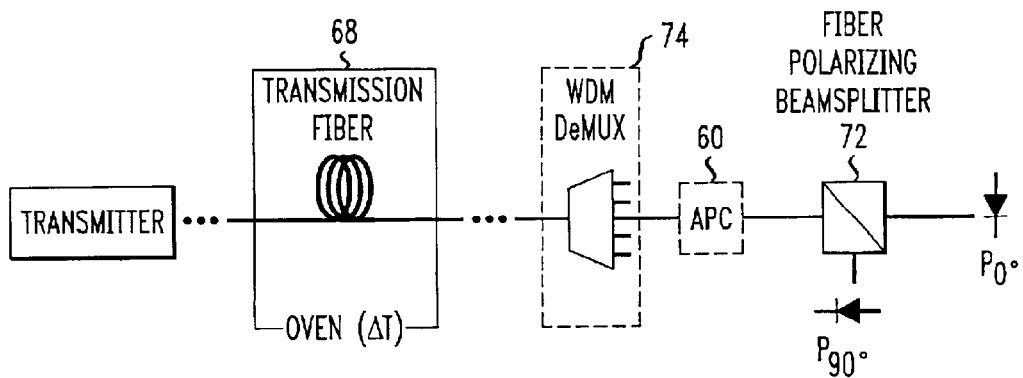
FIG. 11 illustrates an alternative system using an active polarization controller arrangement, in particular to filter out orthogonal optical noise.
Figure 12:
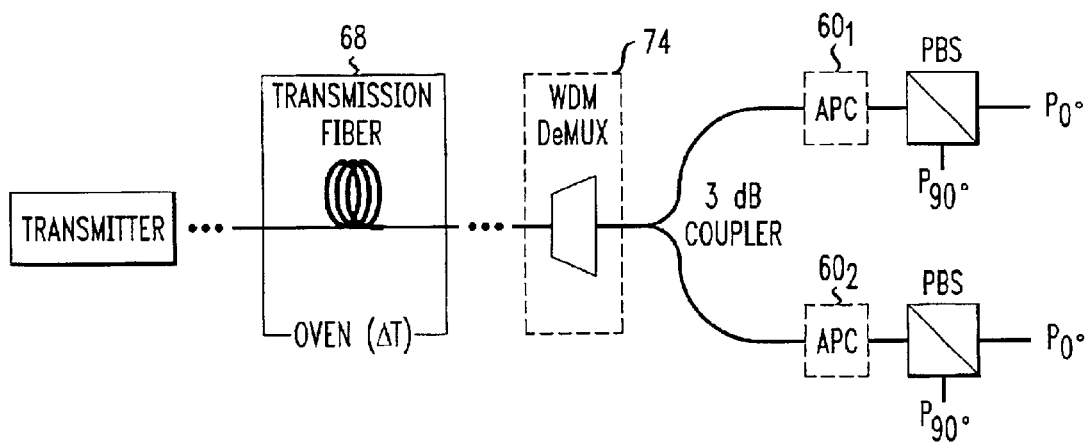
FIG. 12 is an alternative to the arrangement of FIG. 11, where two parallel paths are first established and "active polarization control" is applied to each path.

One exemplary system application utilizing a combination of a polarization beam splitter 72 and APC 60 is illustrated in FIG. 11. In this case, the combination is used to control the routing of a signal on two different paths, as determined by which of the two orthogonal states are input to beam splitter 72. A demultiplexer 74 for separating orthogonal polarizations is disposed, as shown, at the input to APC 60. Demultiplexer 74 is used to separate two orthogonal signals at or near the same wavelength. Beam splitter 72 can be used as shown to filter out optical noise in the orthogonal polarization from amplifier ASE (or other noise sources). Since polarization independent amplifiers accumulate ASE in all polarizations, half of the noise will be present in the polarization that is orthogonal to the amplified signal. Therefore, the noise from an amplifier can be filtered, using APC 60 to maintain signal transmission through a polarizer or polarization beam splitter. An APC could likewise separate two orthogonal channels, taking into account any drift in polarization state. However, this approach requires either wavelength or RF-tone demultiplexing (as described earlier) to separate the two simultaneous input signals. One potential difficulty with this approach is that small amounts of polarization dependent loss (PDL), birefringence, or wavelength difference between the orthogonal signals can slightly reduce their orthogonality. In such a case, a single polarization beam splitter is not able to completely demultiplex the two signals. Therefore, APC 60 is used to minimize the transmitted component of the unwanted signal, rather than maximize the desired signal. Since this approach cannot be taken on the same signal at the same time, the filtering must be done in parallel, as shown in FIG. 12 which utilizes a pair of APC's, denoted $60_1$ and $60_2$. Such an arrangement allows the crosstalk for detected signals to be minimized independently for both channels, providing better noise characteristics than would otherwise be possible.

Figure 13:
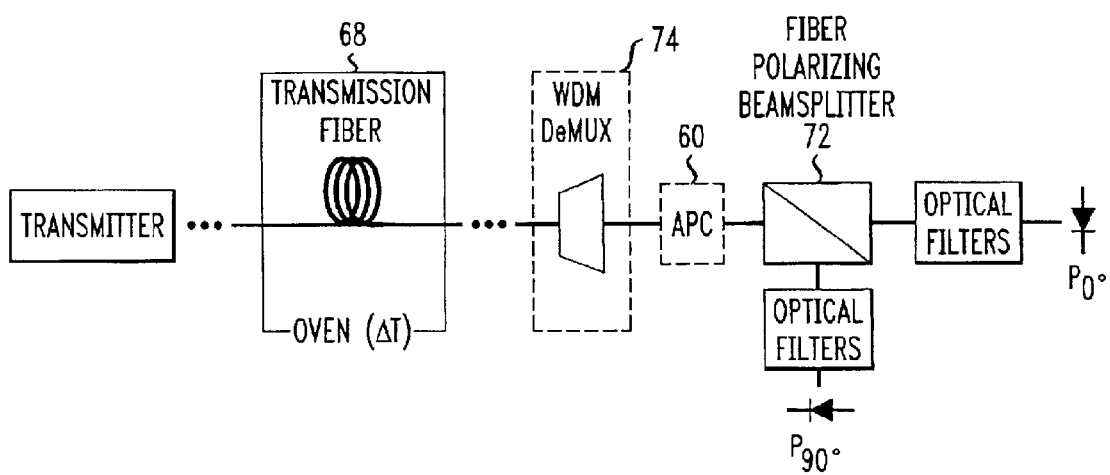
FIG. 13 is yet another alternative to the arrangement of FIG. 1, where in this case narrowband wavelength filters are added to complement the polarization demultiplexing operation.

An alternative approach, illustrated in FIG. 13, is to use slightly wavelength offset orthogonal channels that could be separated by a filter after the polarization beam splitter. This reduces the number of components, when compared to the arrangement of FIG. 12, and also shares the filtering requirements between the "coarse" WDM 74, beam splitter 76 and optical filters 78, 80.

Another embodiment of the present invention, which can be considered as a hybrid approach, is to use polarization-assisted wavelength demultiplexing with the configuration of FIG. 11. Such an arrangement is particularly useful when applied to polarization interleaving of closely-spaced WDM channels. Such alternate-orthogonal channels may already be present to lower nonlinearities during transmission, and since experimental work verifies that these closely spaced channels (<100 GHz at 1550 nm) largely maintain their orthogonality even after propagation over very long distances, it should be possible to exploit this orthogonality to share the demanding filtering requirements for such closely spaced channels between filters in the wavelength and polarization domains. This will ultimately allow adequate filter performance with closer channel spacings than would be possible by any solely optical filtering approach.

It is to be noted that various other "polarization sensitive" devices may be used in conjunction with an APC of the present invention. For example, optical amplifiers or modulators with polarization dependent phase shifts may be employed, or in general any device that requires interference of two or more beams.

Further, the APC arrangements as discussed above all utilized an in-line polarimeter is close proximity to a polarization controller. In another embodiment, the polarization controller may be located at the transmitter and the in-line polarimeter at the receiver. The feedback from the polarimeter to the polarization controller can then be sent via telemetry or other intranetwork communication to avert higher order PMD fading using deterministic polarization control.

Although the present invention has been described herein with respect to one or more embodiments, it will be understood that other arrangements or configurations can also be made without departing from the spirit and scope hereof. Thus, the present invention is considered to be limited only by the scope of the claims appended hereto and the reasonable interpretation thereof.

What is claimed is:

1. An active polarization control arrangement for use in an optical transmission system, the active polarization control arrangement comprising
   a polarization control element responsive to an input optical signal propagating along an optical fiber transmission path and further comprising a correction signal input, the polarization control element for producing as an output an optical signal exhibiting a predetermined state of polarization;
   a complete in-line fiber polarimeter formed as an integral part of the optical fiber transmission path at the output of the polarization control element and configured to out-couple signals determined by the state of polarization of the input optical signal, the complete in-line comprising a set of four filter elements incorporated in the optical fiber transmission path, each filter element tilted at one of the predetermined angles of 0°, 60°, 150°, and 90°, with a waveplate oriented at an angle of 30° with respect to the optical axis disposed between the second and third filter elements; and
   a feedback control element responsive to the out-coupled signals from the complete in-line fiber polarimeter, said feedback control element far providing correction signal inputs to the polarization control element based on the out-coupled signals from the complete in-line polarimeter.

2. An active polarization control arrangement as defined in claim 1 wherein the complete in-line fiber polarimeter set of four filter elements comprises a set of four fiber gratings.

3. An active polarization control arrangement as defined in claim 1 wherein the complete in-line fiber polarimeter set of four filter elements includes a set of four dielectric filters.

4. An optical transmission system comprising a transmitter for providing one or more optical input signals, an optical fiber transmission path and an optical receiver, said optical transmission system further comprising
   at least one active polarization control arrangement, each active polarization control arrangement including
   a polarization control element responsive to one or more input optical signals propagating along the optical fiber transmission path, the polarization control element for producing as an output an optical signal exhibiting a predetermined state of polarization;
   a complete in-line fiber polarimeter integral with said optical fiber transmission path and configured to out-couple signals determined by the state of polarization of the input optical signal, the complete in-line comprising a set of four filter elements incorporated in the optical fiber transmission path, each filter element tilted at one of the predetermined angles of 0°, 60°, 150°, and 90°, with a waveplate oriented at an angle of 30° with respect to the optical axis disposed between the second and third filter elements; and
   a feedback control element disposed in a signal path between the complete in-line fiber polarimeter control signal output and an adjustable input to the polarization control element, said feedback control element for providing correction signal inputs to the polarization control element based on the control signal outputs from the complete in-line fiber polarimeter.

5. An optical transmission system us defined in claim 4 wherein the optical fiber transmission path comprises at least a section of birefringent fiber and the active polarization control arrangement is used to orient the polarization axes of the optical output from the complete in-line fiber polarimeter with the optical axes of the birefringent transmission path optical fiber.

6. An optical transmission system as defined in claim 4 wherein the transmission system further comprises a polarization beam splitter, disposed at the output of the complete in-line fiber polarimeter, the polarization control element utilized to adjust the output signal state of polarization to align with one of the beamsplitter principal axes.

7. An optical transmission system as defined in claim 6 wherein the transmission system further comprises wavelength filters disposed at each output of the polarization beam splitter to discriminate between two orthogonal channels with closely spaced wavelengths.

8. The optical transmission system as defined in claim 7 wherein the at least one active polarization control arrangement comprises a first arrangement disposed at an optical transmitter and a second arrangement disposed at an optical receiver.

9. The optical transmission system as defined in claim 4 wherein the complete polarimeter set of four filter elements comprises a set of four fiber gratings.

10. The optical transmission system as defined in claim 4 wherein the complete polarimeter set of four filter elements includes a set of four dielectric filters.

11. The optical transmission system defined in claim 4 wherein the complete in-line fiber polarimeter is located at the optical receiver and the polarization control element is located at the optical transmitter, using a telemetry channel to transmit feedback information from the complete in-line fiber polarimeter to the polarization control element.

* * * * *